May 7, 1968 R. GUILLEUX 3,382,364
APPARATUS COMPRISING A SIGNAL OUTPUT CIRCUIT RESPONSIVE TO
A VARIABLE D-C VOLTAGE INPUT
Filed Oct. 9, 1963
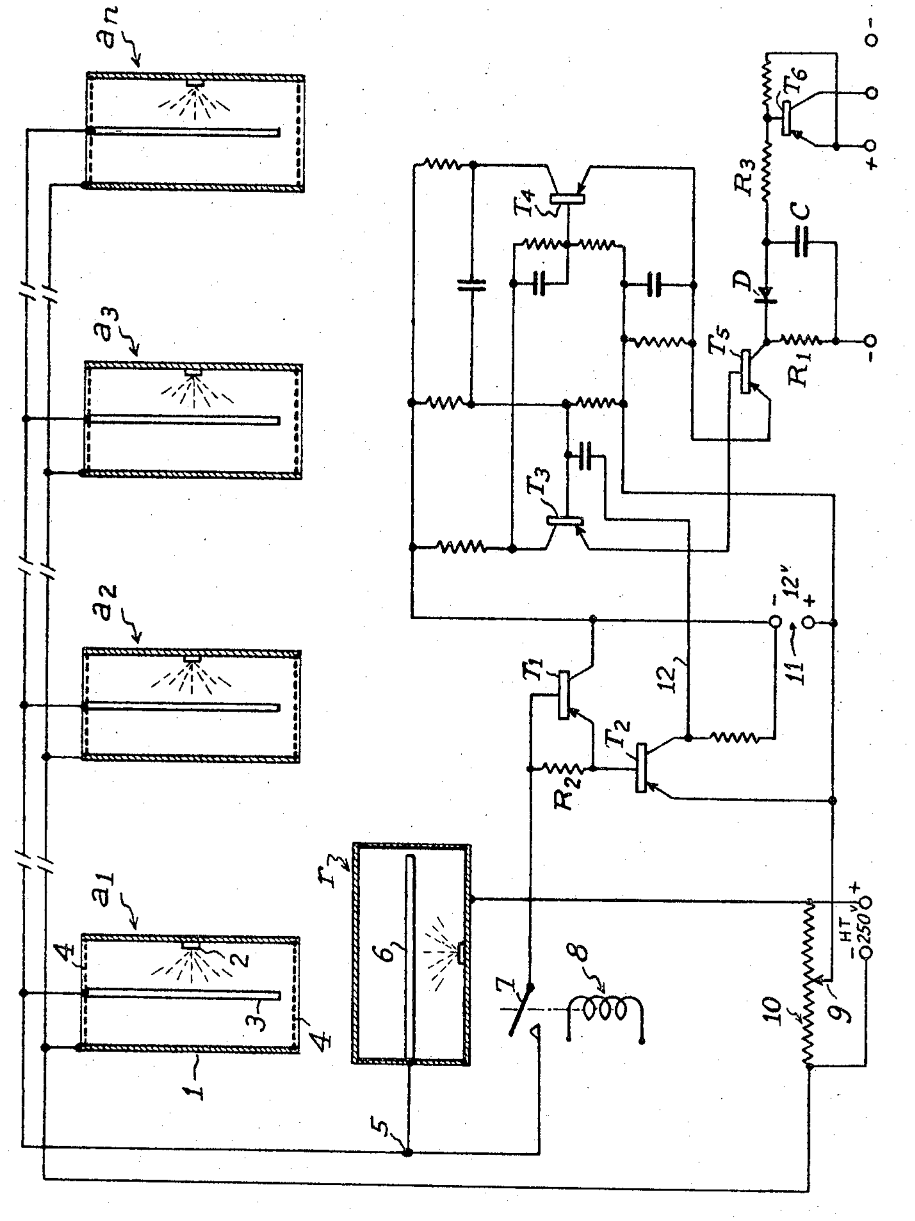

3,382,364

APPARATUS COMPRISING A SIGNAL OUTPUT CIRCUIT RESPONSIVE TO A VARIABLE D-C VOLTAGE INPUT

Robert Guilleux, Chatillon-sous-Bagneux, France, assignor, by mesne assignments, to Compagnie Centrale Sicli, Paris, France
Filed Oct. 9, 1963, Ser. No. 315,072
Claims priority, application France, Oct. 12, 1962, 912,026
5 Claims. (Cl. 250—83.6)

This invention relates to electric circuits of the type adapted to produce output signals usable for purpose of indication and/or control in response to variable D-C input voltage signals.

Objects of the invention include the provision of such a circuit having the following main features and advantages: (1) production of a pulsed output signal, particularly a variable-amplitude pulsed D-C voltage signal, in response to a continuously variable input signal; (2) a type of operation wherein the output signal amplifying section of the circuit is normally isolated from the input signal sensing section and is only intermittently connected thereto, thereby reducing undesirable back-action from the output circuit to the input or sensing section and improving the stability as well as the sensitivity with which a changing input condition can be sensed; (3) facilitation of impedance-matching problems; (4) convenient use of transistorized amplifier circuitry.

Other objects are to provide improved sensing and signalling arrangements responsive to a varying physical condition to provide such arrangements embodying ionization chamber means and to provide improved means of the above character for the sensing of variations in the composition of a gaseous mixture, particularly though not exclusively for purposes of fire detection.

In order to measure the variations in composition of a gas mixture, e.g. for fire detection and control, it is known to pass the gas or a sample thereof through an ionization chamber having electrodes at different potentials and containing a constant ionizing source. Since the conductivity of the gas is a function of its chemical composition, variations in composition can be sensed as variations in the voltage difference across the electrodes in the chamber. In one widely used arrangement of this kind, the ionizing chamber receiving the gas to be monitored is connected in series or in opposition with a reference ionization chamber containing a gas of constant reference composition, so that there is made available at a common electrical junction connected to electrodes of the respective chambers a variable D-C voltage which is a function of the composition of the gas passed through the sensing chamber.

Heretofore, in order to amplify such variable voltage as must be done before the voltage can be utilised for any practical purpose, it has been usual to apply it directly to an input electrode of an electronic amplifier device such as a triode.

In accordance with the invention, there are provided at least one ionization chamber sensing unit defining a capacitor and connected in series with an ionization chamber reference unit which also defines a capacitor, an amplifier, and an intermittently closed, normally open switch connected between the amplifier input terminal and the junction between the sensing unit and the reference unit. With the amplifier input terminal being normally connected to a biassing potential of suitably selected magnitude, each closure of the switch will cause the application to said terminal of a voltage pulse as produced by the charge or discharge current of the capacitance of the sensing device, representing the amount of variation of the variable D-C voltage being sensed, since the preceding instant of switch actuation.

An exemplary embodiment of the invention will now be described for purposes of illustration but not of limitation with reference to the accompanying drawing which is a diagrammatic representation of a fire-detecting system embodying the invention.

The system shown comprises a plurality of ionization chamber sensing units such as *a*1, *a*2, *a*3, . . . an, which may be disposed at selected locations in a building to be supervised. Each sensing unit comprises a simple open-ended tubular vessel 1 made of conductive material and containing a permanent ionizing source in the form of a speck 2 of radioactive material attached to its inner wall surface. Supported coaxially within the tubular vessel 1 which provides the outer electrode of the ionization chamber, is a central electrode 3 insulated from the tubular outer electrode 1. The opposite ends of the tubular vessel have protective screens 4 extending across them for protecting the interior of the chamber from the entrance of foreign objects while allowing free circulation of atmospheric air through the chamber. The ionization chamber units are supported in vertical position as shown to promote such air circulation therethrough by stack effect or natural draft. Preferably the protective screen elements 4 are made from plastic material, e.g. in the form of a mesh of extruded plastic wire, as it has been found that such a construction of the protective screens offers considerably less impedance to gas flow through the chamber than does a conventional wire mesh screen, for a given total flow section area.

The outer electrodes 1 of all the sensers are connected in common to the negative terminal of a D-C voltage source, such as 250 volts D-C. The central electrodes 3 are all connected in parallel to a common junction 5.

The system further includes a reference ionization chamber unit *r* the general construction of which may be similar to that of each of the sensing units *a* except that its ends are sealed so as to enclose within the chamber a body of gas, e.g. air, of constant reference composition. The reference chamber *r* has its wall or outer electrode connected to the positive terminal of the 250 volt D-C source and its central electrode 6 connected to the junction 5.

It will be understood that, the system so far described is fundamentally equivalent to a capacitance device having one electrode, represented by the sum total of the inner electrodes 3 and 6 of the sensing and reference chambers, all connected in parallel to the common junction 5, and two second electrode sections, the one represented by the sum total of the outer electrodes 1 of all the sensing chambers *a*1 . . . *an*, all connected in parallel to the negative terminal of the D-C source, and the other represented by the outer electrode of the reference chamber *r*, connected to the positive terminal of the source. Under steady-state conditions with the atmosphere at all the monitored locations of the building retaining a substantially constant, normal, composition, the ionization factor and hence the conductivity of the gas in all the sensing units *a* also remains constant. There then is a constant resultant rate of flow of opposite-sign charges between the central and outer electrodes of all the sensing units *a*1 . . . *an* in one direction, tending to discharge the afore-mentioned composite capacitance device, and an equal constant resultant rate of flow of charges between the central and outer electrodes of the reference unit *r* in the opposite direction, tending to charge the composite capacitance device. As a net result the potential of the common junction 5 retains a constant level under the steady-state conditions referred to. However, should the composition of the gas in any one of the sensing units a1 . . . an vary as due to the presence of a significant content of combustion gases or smoke therein due to incipient fire at the corresponding monitored location, then the ionization factor and the conductivity of the gas in the related ionization chamber also varies, and the previously obtaining balance condition is destroyed, specifically in the assumed example the rate of discharge of the composite capacitance becomes smaller than its constant rate of charge, and the resultant potential at junction 5 would rise. It will thus be seen that the D-C voltage level at junction 5 represents a measure of the normal or abnormal composition of the gas at all the locations being monitored.

In accordance with the invention the sensing junction 5 is connected to the input of an amplifier circuit presently described, by way of an intermittently operated switch 7. While the switch is here shown as being electromechanical in character and operated by the energization of a relay coil 8, it will be evident that any other, e.g. electronic, switching means may be used if desired.

The amplifier circuit shown comprises two transistor stages T1 and T2 connected in cascade. Transistor T1 has its base connected to the output terminal of switch 7, its collector connected to a negative terminal of a biassing voltage source 11, e.g. −12 volts, and its emitter connected through a by-pass resistor R2 to its base. Transistor T2 has its base connected to the emitter of T1, its emitter connected to an adjustable tap 9 of a potentiometer 10 connected across the high-voltage D-C source, and its collector connected by way of a biassing resistor to the negative terminal of the bias source 11. The collector of T2 is further connected to an output conductor 12 upon which an amplified signal is available for further treatment as presently described. The potentiometer tap 9 is so adjusted as to impose on the amplifier input i.e. the output terminal of switch 7, a potential that is somewhat higher than the steady potential present at the junction 5 i.e. the input terminal of switch 7, under normal conditions.

The conductor 12 carrying the output from the two-stage transistor amplifier circuit is connected by way of a capacitor to the input of a monostable multivibrator circuit comprising a pair of transistors T3 and T4 connected in a conventional Schmitt trigger circuit. This need not be described in detail since its construction and operation are well-known, it being simply indicated that in the normal or quiescent condition transistor T3 is conductive and T4 non-conductive, and that application of a positive voltage pulse from line 12 to the base of T3, renders T3 non-conductive and T4 conductive. The emitters of T3 and T4 are respectively connected to the base and emitter of a transistor T5 forming the first stage of an output amplifier section. The collector circuit of T5 includes a resistor R1 connected to the negative terminal of bias source 11, so that the transistor T5 is normally conductive. Resistor R1 is shunted, through a rectifier diode D, by a capacitor C constituting a time delay network with the resistor R1. The common junction of diode D and capacitor C in the collector circuit of T5 is connected through a further resistor R3 to the base of a final stage transistor T6, having its emitter positively biassed so as to be normally non-conductive. The collector of T6 provides an output terminal for the circuit, which may be connected to any desired load, such as conventional alarm and/or fire-fighting means not shown.

In the operation of the system, with switch 7 in the open condition shown, the base of transistor T1 is placed at a relatively high positive potential from potentiometer tap 9 by way of the emitter-base junctions of transistors T2 and T1 in series, said potential being as earlier stated somewhat higher than the equilibrium potential present at point 5 in the normal condition of the system. Switch 7 is intermittently closed, as by automatic periodic energization of relay winding 8 through conventional timing means not shown (or otherwise), and at each closure of the switch base current flows through transistor T1, rendering transistor T2 conductive so that a high positive voltage appears on line 12. This positive voltage is applied through the capacitor shown to the base of transistor T3 of the monostable multivibrator circuit, so that transistor T3 is rendered non-conductive and T4 conductive. This applies a negative bias to the emitter relative to the base of transistor T5 which is thereupon cut off, so that its collector assumes a negative potential which causes the capacitor C to discharge through the diode D, thereby applying a negative pulse through resistor R3 to the base of transistor T6, which is rendered conductive. A positive voltage is thus transmitted from the emitter to the collector of T6 and appears at the output terminal of the system.

When the switch 7 now opens, transistor T1 is cut off, with the resistor R2 ensuring a reliable cut-off action. Meanwhile the monostable multivibrator circuit has relapsed to its initial condition in which T3 is conducting and T4 cut-off, so that transistor T5 in turn has become conductive and its collector tends to apply a positive voltage to the base of transistor T6. However, the time constant of the RC network associated with the collector of T5 is so selected as to retard the application of a positive voltage to the base of T6 until the next closure of switch 7. Thus, in the normal conditions being considered, the output transistor T6 remains permanently conductive and a permanent positive voltage is present at the output terminal of the system.

It will now be assumed that the chemical composition of the gas present in any one or more of the sensing chambers a1 through an departs from its normal state, as through the presence of combustion gases in one of the chambers due to burning. This destroys the former balance of charges on the composite capacitance device so that, in this instance, the resultant potential at junction 5 rises. For a certain increase in the potential at 5, which is determined by the gain of transistors T1 and T2 and the setting of potentiometer tap 9 and hence is conveniently adjustable to suit requirements, the negative pulse generated at the next closure of the switch 7 becomes insufficient to apply the requisite setting potential to the input of the monostable multivibrator, so that transistor T3 is not cut off, nor does it in turn cut off transistor T5. The collector of T5 hence retains a positive potential, and after a time determined by the time constant of the delay network, this positive voltage applied to the base of transistor T6 causes this latter to lapse to its cut-off state, removing the positive potential from the output terminal connected to its collector. This is effective to actuate any warning and control devices connected to said output terminal.

It will be noted that in the above described operation every time the switch 7 is reopened the potential at the sensor output junction 5 returns to a value determined exclusively by the charges present on the sensing electrodes 3 and hence by the condition being sensed, herein the gas composition or smoke content in all of the ionization chambers. Since the switch 7 can be operated to close for relatively short periods separated by comparatively long open periods e.g. of the order of a few seconds, without detracting from the practical efficiency of the monitoring process, undesirable disturbance of the sensing action by the output of the systems can be made practically negligible, thereby increasing the sensitivity and stability of the monitoring process.

Various modifications and departures from the illustrative embodiment shown may be made within the scope of the invention. Thus, two (or more) transistorized output circuits similar to the one here shown may be connected in parallel to the output terminal of switch 7, with different adjustments (especially in regard to the setting of potentiometer tap 9), so as to respond to different conditions of the magnitude being sensed. For example a second such output circuit may be adjusted to respond to a short-circuit condition in any one of the sensor units *a*1 through *an*, or to the presence of an abnormally conductive gas mixture therein, and thereupon to actuate an alarm which may be separate from the one earlier referred to.

The pulsed D-C output present on conductor 12 may be utilised in various other ways than here shown, for example in digital apparatus for remote transmission and control. The variable-amplitude, constant-repetition rate, pulse train available at conductor 12 in the embodiment described may if desired be converted into a constant-amplitude, variable-repetition rate pulse train as by using the output potential at line 12 to modify the time period between successive energizations of the relay winding 8 in such a manner as to maintain said output potential substantially constant. Various other modifications will occur to those familiar with the arts involved.

What I claim is:

1. Monitoring apparatus comprising, in combination:

(a) at least one ionization chamber sensing unit defining a capacitor;

(b) an ionization chamber reference unit defining a capacitor and connected in series with said at least one sensing unit;

(c) D.C. voltage supply means connected across the series circuit constituted by said sensing and reference units;

(d) an amplifier circuit having an input terminal;

(e) normally open switch means connected between said input terminal and the junction between said reference unit and said at least one sensing unit; and (f) switch closing means operatively connected with said switch means for periodically opening and closing the latter in a continual manner so as to conductively connect said junction to said input terminal, thereby to apply the voltage appearing at said junction to said input terminal in the form of a plurality of voltage pulses whose amplitudes are proportional to the load on those electrodes of said ionization chamber units which are connected together at such junction.

2. An arrangement is defined in claim 1 wherein said at least one sensing unit is arranged to be traversed by a gas mixture whose composition is to be monitored and said reference unit contains an enclosed mass of a reference gas.

3. An arrangement as defined in claim 2 wherein each said sensing unit comprises a vertically oriented tubular member constituting one electrode of the capacitor defined by said sensing unit, a rod member disposed axially within said tubular member and constituting the other electrode of the capacitor defined by said sensing unit, said rod member being electrically insulated from said tubular member, an ionizing source disposed within said tubular member, and two plastic screens each extending across a respective one of the ends of said tubular member.

4. An arrangement as defined in claim 3 wherein said reference unit comprises a tubular member constituting one electrode of the capacitor defined by said reference unit, a rod member disposed within said tubular member and constituting the other electrode of the capacitor defined by said reference unit, said rod member being electrically insulated from said tubular member, an ionizing source disposed within said tubular member, closing means sealing the ends of said tubular member, and a mass of reference gas enclosed within said tubular member.

5. An arrangement as defined in claim 1 wherein there are provided a plurality of ionization chamber sensing units each defining a capacitor and all electrically connected together in parallel.

References Cited

UNITED STATES PATENTS

| | | | |
|---|---|---|---|
| 2,735,944 | 2/1956 | Green | 250—44 X |
| 2,876,360 | 3/1959 | Victoreen | 250—83.6 |
| 3,009,098 | 11/1961 | Simons | 250—44 X |
| 3,056,123 | 9/1962 | Shamos | 250—83 |
| 3,056,886 | 10/1962 | Glaude et al. | 250—83.6 X |
| 3,235,858 | 2/1966 | Mader | 250—83.6 X |

ARCHIE R. BORCHELT, *Primary Examiner.*